US009729232B2

(12) United States Patent
Yao et al.

(10) Patent No.: US 9,729,232 B2
(45) Date of Patent: Aug. 8, 2017

(54) METHOD AND DEVICE FOR ESTIMATION OF CHROMATIC DISPERSION IN OPTICAL COHERENT COMMUNICATION

(71) Applicant: ZTE CORPORATION, Shenzhen, Guangdong Province (CN)

(72) Inventors: Yangzhong Yao, Shenzhen (CN); Qiang Li, Shenzhen (CN); Yunpeng Li, Shenzhen (CN); Guohua Gu, Shenzhen (CN); Wei Ren, Shenzhen (CN)

(73) Assignees: ZTE CORPORATION (CN); Sanechips Technology Co., Ltd. (CN)

( * ) Notice: Subject to any disclaimer, the term of this patent is extended or adjusted under 35 U.S.C. 154(b) by 0 days.

(21) Appl. No.: 15/030,834

(22) PCT Filed: May 23, 2014

(86) PCT No.: PCT/CN2014/078327
§ 371 (c)(1),
(2) Date: Apr. 20, 2016

(87) PCT Pub. No.: WO2014/183699
PCT Pub. Date: Nov. 20, 2014

(65) Prior Publication Data
US 2016/0269108 A1 Sep. 15, 2016

(30) Foreign Application Priority Data

Oct. 22, 2013 (CN) .......................... 2013 1 0498534

(51) Int. Cl.
H04B 10/06 (2006.01)
H04B 10/12 (2006.01)
(Continued)

(52) U.S. Cl.
CPC ..... *H04B 10/07951* (2013.01); *H04B 10/612* (2013.01); *H04B 10/613* (2013.01);
(Continued)

(58) Field of Classification Search
None
See application file for complete search history.

(56) References Cited

U.S. PATENT DOCUMENTS 8,681,885 B2 * 3/2014 Chung ................ H04L 27/0014
375/260
8,930,430 B2 * 1/2015 Stojanovic ....... H04B 10/07951
398/29
(Continued)

FOREIGN PATENT DOCUMENTS

CN 1729666 A 2/2006
CN 102511136 A 6/2012
(Continued)

OTHER PUBLICATIONS

International Search Report and Written Opinion issued Sep. 5, 2014 in PCT Patent Application No. PCT/CN2014/078327.

Primary Examiner — Ken N Vanderpuye
Assistant Examiner — Jai Lee
(74) Attorney, Agent, or Firm — Plumsea Law Group, LLC

(57) ABSTRACT

Disclosed are a chromatic dispersion estimation method and device in optical coherent communication, wherein, the method includes: performing a fast Fourier transform on IQ-imbalance compensated data to obtain frequency-domain data in two polarization directions; calculating autocorrelation sequences of the frequency-domain data and performing an inverse fast Fourier transform on the values of the autocorrelation sequences; calculating modulus squares of the results of the inverse fast Fourier transform, and adding the results in the two polarization directions to obtain;
(Continued)

determining a mean value of s of a plurality of data sets; calculating an index of the maximum value of, and estimating a dispersion value of the optical fiber link according to the index of the maximum value of. The abovementioned technical solution allows a significantly accurate and rapid estimation of dispersion values.

17 Claims, 4 Drawing Sheets

(51) Int. Cl.
    *H04B 10/00*     (2013.01)
    *H04B 10/079*     (2013.01)
    *H04B 10/61*     (2013.01)

(52) U.S. Cl.
    CPC ..... *H04B 10/6161* (2013.01); *H04B 10/6165* (2013.01); *H04B 10/6166* (2013.01); *H04B 10/6163* (2013.01)

(56) References Cited

U.S. PATENT DOCUMENTS

| | | | | |
|---|---|---|---|---|
| 9,203,508 | B2* | 12/2015 | Hauske | H04B 10/07 |
| 9,225,431 | B1* | 12/2015 | Arabaci | H04B 10/6161 |
| 2012/0033965 | A1* | 2/2012 | Zhang | H04B 10/611 |
| | | | | 398/38 |
| 2012/0185523 | A1* | 7/2012 | Hauske | H04B 10/25133 |
| | | | | 708/300 |
| 2013/0216239 | A1* | 8/2013 | Zhang | H04B 10/613 |
| | | | | 398/202 |
| 2013/0230313 | A1* | 9/2013 | Yan | H04L 25/0202 |
| | | | | 398/25 |

FOREIGN PATENT DOCUMENTS

| | | | |
|---|---|---|---|
| CN | 103004110 A | 3/2013 | |
| CN | WO 2014019211 A1 * | 2/2014 | ....... H04B 10/07951 |
| WO | 2013113378 A1 | 8/2013 | |

* cited by examiner

METHOD AND DEVICE FOR ESTIMATION OF CHROMATIC DISPERSION IN OPTICAL COHERENT COMMUNICATION

CROSS-REFERENCE TO RELATED APPLICATION(S)

This application is the U.S. National Phase application of PCT application number PCT/CN2014/078327 having a PCT filing date of May 23, 2014, which claims priority of Chinese patent application 201310498534.7 filed on Oct. 22, 2013, the disclosures of which are hereby incorporated by reference.

TECHNICAL FIELD

The present document relates to the field of chromatic dispersion estimation technologies in the optical coherent communication, and more particularly, to a chromatic dispersion estimation method and device in the optical coherent communication.

BACKGROUND OF RELATED ART

With the increase of Internet traffic, larger capacity is needed in the optical communication system of the trunk system. When the bit rate per wavelength increases, the chromatic dispersion, polarization mode dispersion, and waveform distortions of various non-linear effects in the transmission path result in serious degradation in the quality of the information.

Compared with the incoherent technology, the digital coherent reception technology has the following advantages: it has approximately 3 dB optical signal to noise ratio (OSNR) gain; it can easily adopt the electronic equalization technique to cope with channel variations and reduce costs; it can use more efficient modulation techniques and polarization multiplexing to increase the transmission capacity. Thus the digital coherent technology is considered as a key technology in the high-speed optical communication system.

In the optical coherent receiver, the signal light and the local oscillation light are mixed, amplitude information and phase information of the signal light are moved to the baseband signal, thus the optical coherent detection retains all the information of the light field and can take the advantages of the digital signal processing technology in features and performance. Using the electric equalization technology can almost completely compensate for linear distortions of the optical signal, such as compensating the chromatic dispersion (CD), the polarization mode dispersion (PMD), and the like.

FIG. 1 (a) is a block diagram of a typical digital coherent receiver. The received optical signal is split into two mutually orthogonal polarization signals by a polarization beam splitter (PBS). The polarized signal output by the PBS is mixed with a local oscillation optical signal through a 90° optical mixer. The mixed optical signal is converted to a baseband electrical signal through a balancing photoelectrical detector. The photoelectrically-converted electrical signal has two signals for each polarization state, but the four signals do not correspond to the original four signals, this is because, after passing through the transmission channel, there is crosstalk between the two polarization states, and the polarization states rotate, the two polarization states at the receiving ends, the two orthogonal signals of each polarization state and the transmitted signals do not have a correspondence. The photoelectrically-converted electrical signal is converted into a digital signal by the ADC. The general digital signal processing technology can be used to process the ADC converted digital signal.

The digital signal processing part, as shown in FIG. 1 (b), comprises the IQ Skew compensation, the IQ imbalance compensation, chromatic dispersion (CD) compensation, dispersion estimation, clock recovery, polarization demultiplexing, carrier recovery, judgment detection. The IQ Skew adjusts delays of the 4 signals, and solves the inconsistencies in the delays of the 4 signals at the photoelectric conversion front end. The chromatic dispersion (CD) compensation unit often uses the sampling frequency domain fast convolution technique to compensate the chromatic dispersion of the optical link. The clock recovery adjusts the sampling phase, and provides data with a stable sampling phase for the polarization demultiplexing module thereafter. The polarization demultiplexing compensates the residual dispersion and polarization mode dispersion (PMD). The carrier recovery compensates for inconsistencies in frequencies of the local oscillation light at the receiving end and the carrier light at the sending end. Wherein the value of the chromatic dispersion (CD) is generally large, the equalization of the chromatic dispersion and the polarization mode dispersion (PMD) is generally completed in two parts, first, static dispersion is compensated, wherein the equalizer usually cannot use a standard adaptive algorithm to update coefficients, such as compensating 40000 ps/nm chromatic dispersion, the number of filter taps should reach big hundreds or even thousands, and typically the fast Fourier transform technology is used for frequency domain fast convolution. The dispersion estimation module provides the dispersion compensation module with dispersion value to be compensated.

The compensation of the residual chromatic dispersion and polarization mode dispersion is achieved by a FIR butterfly equalizer, wherein the FIR butterfly filter uses an adaptive algorithm to update the coefficients to track and compensate the polarization mode dispersion that dynamically changes over time. The FIR butterfly equalizer is also known as polarization demultiplexing. The FIR butterfly adaptive equalizer has the functions of equalizing, matching and filtering, and sampling position adjusting. When the sampling position change range is too large, or the sampling frequency offset exists, the sampling phase change range exceeds the adjustment range of the FIR butterfly adaptive equalizer, it will cause the FIR butterfly adaptive equalizer to not work properly. It needs to place a clock recovery module before the FIR butterfly equalizer.

The clock recovery estimates the sampling time error of an input symbol, and performs interpolation adjustment on the sampling time of the symbols, or adjusts the ADC sampling frequency via the VCO, to guarantee to provide a stable symbol sampling phase. The clock recovery phase detector needs to tolerate a certain signal distortion, while the conventional clock recovery usually can only tolerate small dispersion. In order to not increase the complexity of the clock recovery module, while currently there is a lack of clock recovery method that tolerances large residual dispersion value, it requires an accurate dispersion compensation.

In summary, with the method proposed in the related art for performing feedback control of a variable dispersion compensator by using the transmission quality information (e.g., error rate, Q factor, etc.), a dispersion interval with a certain step size is used to change the dispersion compensation amount of a dispersion compensation filter, until the system converges. When the system starts up, the search process is slow and the accuracy is low. Moreover, the optical fiber link is affected by the environmental temperature change, and the link dispersion value also changes slowly. In addition, in the working process, with the search based dispersion estimation method in the related art, it is difficult to judge a slow change of the dispersion value in the operation.

SUMMARY

To solve the technical problem, the embodiment of the present document is to provide a dispersion estimation method and device in coherent optical communication to improve the dispersion measurement accuracy and efficiency.

To solve the abovementioned problems, the following technical solution is used:

A dispersion estimation method in optical coherent communication, comprising:

performing a fast Fourier transform on IQ-imbalance compensated data to obtain frequency domain data in two polarization directions;

respectively calculating autocorrelation sequences of the frequency domain data in the two polarization directions to obtain values of the two autocorrelation sequences corresponding to the frequency domain data in the two polarization directions;

respectively performing the fast inverse Fourier transform on the values of the two autocorrelation sequences to obtain two inverse Fourier transform results;

respectively calculating modulus squares of the two fast inverse Fourier transform results to obtain two modulus square results;

adding the two modulus square results to obtain a sum of the modulus square results P[n];

for a plurality of IQ-imbalance compensated data, calculating a plurality of sums of the plurality of modulus square results, averaging all sums of the modulus square results to obtain a dispersion objective function P[n];

calculating an index $n_0$ of a maximum value of the dispersion objective function P[n] and estimating an optical fiber link dispersion value based on the index $n_0$.

Alternatively, the step of performing a fast Fourier transform on IQ-imbalance compensated data to obtain frequency domain data in two polarization directions comprises:

respectively performing the fast Fourier transform on the two IQ-imbalance compensated polarization data to obtain frequency domain data X[k] and Y[k] in two polarization directions in the following manner, where k=0, . . . , $N_{\mathit{fft}}$−1, k is a frequency index, $N_{\mathit{fft}}$ is a number of Fourier transform points:

calculating a spectrum of non-orthogonal signals in the two polarization directions according to the following equation to obtain the frequency domain data in the two polarization directions:

$X_t[k]=X[k] \cos \theta_t + Y[k] \sin \theta_t$, t=1, 2, wherein, $$\theta_1 = 0, \theta_2 = \frac{\pi}{4}.$$

Alternatively, the step of performing a fast Fourier transform on IQ-imbalance compensated data to obtain frequency domain data in two polarization directions comprises:

using a frequency domain convolution transform or a fast Fourier transform to obtain the frequency domain data in the two polarization directions.

Alternatively, an autocorrelation sequence interval of the frequency domain data in the two polarization directions is baud rate;

the step of calculating autocorrelation sequences of the frequency-domain data in the two polarization directions to obtain values of the two autocorrelation sequences corresponding to the frequency domain data in the two polarization directions comprises:

according to the following equation, calculating the autocorrelation sequence $C_1[k]$ of the spectrum $X_1[k]$ and the autocorrelation sequence $C_2[k]$ of the spectrum $X_2[k]$ in the frequency domain data in the two polarization directions:

$C_t[k]=X_t[k]X_t^{*k}[k+k_{baud}]$, k=0, . . . , K, t=1, 2, wherein, K is an integer not greater than $N_{\mathit{fft}}-1-k_{baud}$, $k_{baud}$ is a frequency index interval corresponding to the baud rate.

Alternatively, the step of respectively performing the fast inverse Fourier transform on the values of the two autocorrelation sequences to obtain two inverse Fourier transform results comprises:

according to the following equation, respectively performing the fast inverse Fourier transform on the values of the two autocorrelation sequences:

$P_t[n]=\Sigma_{k=1}^{K} C_t[k]\theta^{j2\pi nk/N_{\mathit{1fft}}}$, n=−$N_{\mathit{1fft}}$, . . . , $N_{\mathit{1fft}}$−1, t=1, 2, Wherein $N_{\mathit{1fft}}$ is a number of Fourier transform points.

Alternatively, the step of adding the two modulus square results to obtain a sum of the modulus square results P[n] comprises:

calculating the sum of the modulus square results according to the following equation:

$P[n]=|P_1[n]|^2+|P_2[n]|^2$, n=−$N_{\mathit{1fft}}$, . . . , $N_{\mathit{1fft}}$−1, where $N_{\mathit{1fft}}$ is the number of Fourier transform points.

Alternatively, after calculating the index $n_0$ of the maximum value of the dispersion objective function P[n], the method further comprises:

using an interpolation equation to correct the index $n_0$.

Alternatively, the step of using the interpolation equation to correct the index $n_0$ comprises:

correcting the index $n_0$ according to the following Parabolic interpolation equation to obtain a corrected result:

$$n'_0 = n_0 + \frac{P[n_0 - 1] - P[n_0 + 1]}{2(P[n_0 - 1] - 2P[n_0] - P[n_0 + 1])};$$

wherein, $n'_0$ is the corrected result.

Alternatively, the step of estimating an optical fiber link dispersion value based on the index $n_0$ of the maximum value comprises:

calculating the fiber link dispersion value CD according to the following equation:

$$CD = \frac{n'_0}{\Delta f \cdot N_{\mathit{1fft}}} \cdot \frac{c}{\lambda^2 f_{baud}}$$

Wherein, c is a speed of light in vacuum, λ is a wavelength of an optical carrier in vacuum, $f_{baud}$ and is a baud rate.

A dispersion estimation device in optical coherent communication, comprising a dispersion compensation unit and a dispersion estimation unit, wherein:

the dispersion compensation unit is configured to: perform a imbalance compensation on an IQ, perform a fast Fourier transform on IQ-imbalance compensated data to obtain frequency domain data in two polarization directions;

the dispersion estimation unit comprises a first module, a second module and a third module, wherein:

the first module is configured to: respectively calculate autocorrelation sequences of the frequency domain data in the two polarization direction to obtain values of the two autocorrelation sequences corresponding to the frequency domain data in the two polarization directions;

the second module is configured to: respectively perform the fast inverse Fourier transform on the values of the two autocorrelation sequences to obtain two inverse Fourier transform results; respectively calculate modulus squares of the two fast inverse Fourier transform results to obtain two modulus square results; add the two modulus square results to obtain a sum of the modulus square results P[n].

the third module is configured to: for a plurality of IQ-imbalance compensated data, average a plurality of obtained sums of the modulus square results to obtain a dispersion objective function P[n]; calculate an index $n_0$ of a maximum value of the dispersion objective function P[n], and estimate an optical fiber link dispersion value based on the index $n_0$.

Alternatively, the dispersion estimation unit is configured to: perform a fast Fourier transform on IQ-imbalance compensated data to obtain frequency domain data in two polarization directions in the following manner:

respectively performing the fast Fourier transform on the two IQ-imbalance compensated polarization data to obtain the frequency domain data X[k] and Y[k] in the two polarization directions in the following manner, where k=0, . . . , $N_{fft}$-1, k is a frequency index, $N_{fft}$ is a number of Fourier transform points:

calculating a spectrum of non-orthogonal signals in the two polarization directions according to the following equation to obtain the frequency domain data in the two polarization directions:

$X_t[n]=X[k]\cos\theta_t+Y[k]\sin\theta_t$, t=1, 2, wherein, $$\theta_1 = 0, \theta_2 = \frac{\pi}{4}$$

Alternatively, the first module is configured to calculate autocorrelation sequences of the frequency-domain data in the two polarization directions to obtain values of the two autocorrelation sequences corresponding to the frequency domain data in the two polarization directions in the following manner:

according to the following equation, calculating the autocorrelation sequence $C_1[k]$ of the spectrum $X_1[k]$ and the autocorrelation sequence $C_2[k]$ of the spectrum $X_2[k]$ in the frequency domain data in the two polarization directions, wherein, the autocorrelation sequence interval of the frequency domain data is baud rate:

$C_t[k]=X_t[k]X_t^{*}[k+k_{baud}]$, k=0, . . . , K, t=1, 2, wherein, K is an integer not greater than $N_{fft}-1-k_{baud}$, $k_{baud}$ is a frequency index interval corresponding to the baud rate.

Alternatively, the second module is configured to respectively perform the fast inverse Fourier transform on the values of the two autocorrelation sequences to obtain two inverse Fourier transform results in the following manner:

according to the following equation, respectively performing the fast inverse Fourier transform on the values of the two autocorrelation sequences:

$P_t[n]=\Sigma_{k=1}^{K}C_t[k]\theta^{j2\pi nk/n_{1fft}}$, n=$-N_{1fft}$, . . . , $N_{1fft}$-1, t=1, 2, wherein $N_{1fft}$ is a number of Fourier transform points.

Alternatively, the second module is configured to add the two modulus square results to obtain a sum of the modulus square results P[n] in the following manner:

calculating the sum of the modulus square results P[n] according to the following equation:

$P[n]=|P_1[n]|^2+|P_2[n]|^2$, n=$-N_{1fft}$, . . . , $N_{1fft}$-1.

Alternatively, the dispersion estimation unit further comprises a correction module, wherein:

the correction module is configured to: use an interpolation equation to correct the index $n_0$.

Alternatively, the correction module is configured to correct the index $n_0$ according to the following Parabolic interpolation equation:

$$n_0' = n_0 + \frac{\tilde{P}[n_0-1] - \tilde{P}[n_0+1]}{2(\tilde{P}[n_0-1] - 2\tilde{P}[n_0] - \tilde{P}[n_0+1])};$$

wherein, $n_0'$ is the corrected result.

Alternatively, the third module is configured to estimate an optical fiber link dispersion value based on the index $n_0$ in the following manner:

calculating the fiber link dispersion value according to the following equation:

$$CD = \frac{n_0'}{\Delta f \cdot N_{1fft}} \cdot \frac{c}{\lambda^2 f_{baud}}$$

wherein, c is a speed of light in vacuum, λ is a wavelength of an optical carrier in vacuum, and $f_{baud}$ is a baud rate.

Alternatively, the dispersion compensation unit is configured to perform a fast Fourier transform on IQ-imbalance compensated data to obtain frequency domain data in two polarization directions in the following manner:

using a frequency domain convolution transform on the IQ-imbalance compensated data to obtain the frequency domain data in the two polarization directions.

Alternatively, the dispersion estimation unit further comprises:

a Fourier transform module, which uses the fast Fourier transform on the IQ-imbalance compensated data to obtain frequency domain data in two polarization directions respectively.

The abovementioned technical solution can directly calculate the dispersion without searching, thus, when the system starts, the value of the link dispersion can be quickly estimated. When the system is running, it may also continue to estimate the link dispersion value, track its change, and ensure the dispersion compensation module to precisely compensate the dispersion. It can achieve precise dispersion compensation, and can reduce the complexity of the clock recovery module thereafter, and the like. To sum up, compared with the related art, the abovementioned technical solution can very accurately estimate the dispersion value, and the estimation speed is fast.

BRIEF DESCRIPTION OF THE DRAWINGS

FIG. 1 (b) is a schematic diagram of digital signal processing in the digital coherent receiver shown in FIG. 1 (a);

PREFERRED EMBODIMENTS

Hereinafter, in conjunction with the accompanying drawings, the technical solution of the present document will be described in further detail. It should be noted that, in the case of no conflict, embodiments and features in the embodiments of the present application may be arbitrarily combined with each other.

The First Embodiment

Figure 1A:
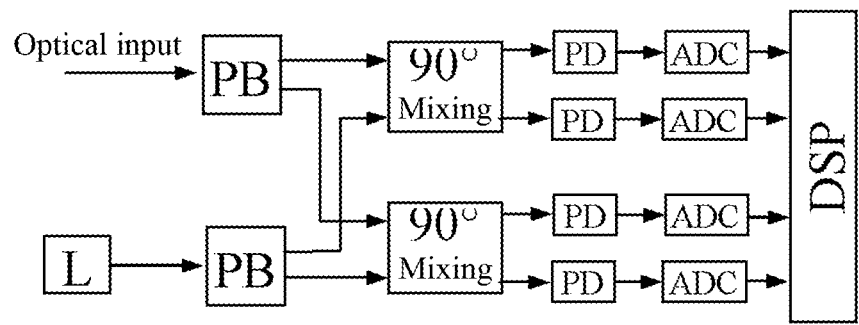
FIG. 1 (a) is a block diagram of a typical digital coherent receiver in the related art.
Figure 1B:
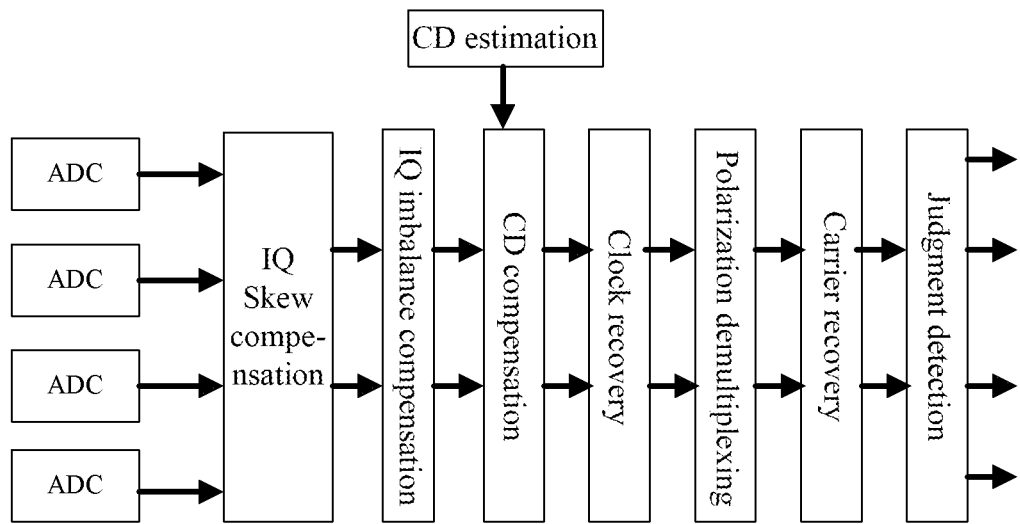
Figure 2:
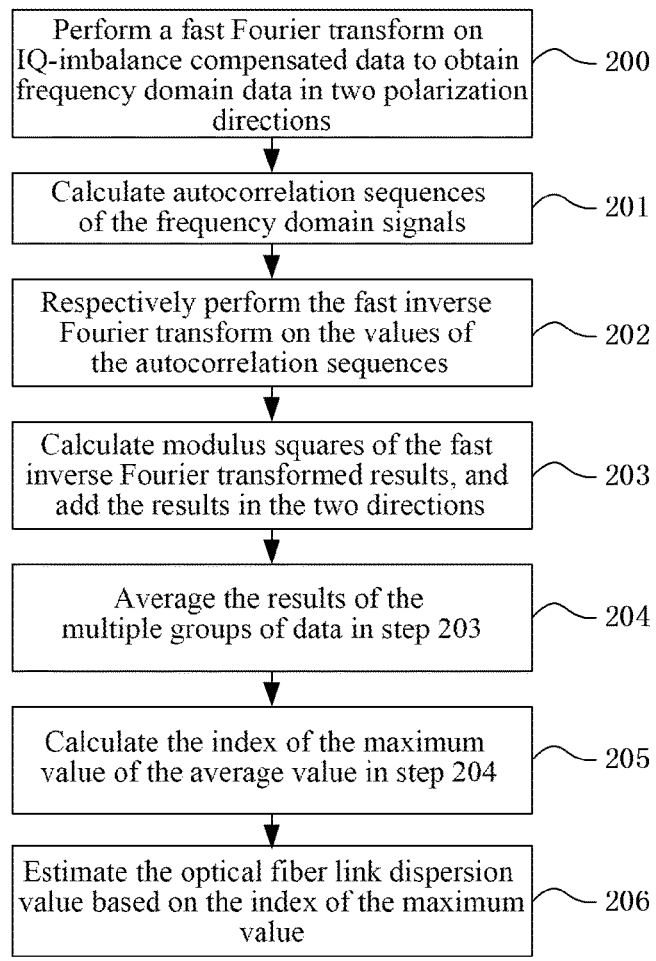
FIG. 2 is a flow chart of dispersion estimation in the optical coherent communication in accordance with an embodiment of the present document.

The embodiment of the present document provides a dispersion estimation method in optical coherent communication, and as shown in FIG. 2, it comprises the following steps:

in step 200, it is to perform a fast Fourier transform on IQ-imbalance compensated data to obtain frequency domain data in two polarization directions;

Usually, the dispersion compensation module uses the frequency domain convolution technology, and can provide frequency domain data for the CD estimation module. Or, the CD estimation module separately performs FFT on the IQ-imbalance compensated time domain signal to obtain frequency domain data.

For the polarization multiplexing digital coherent receiver, there are two orthogonal polarization states, the frequency domain signals $X[k]$ and $Y[k]$, $k=0, \ldots, N_{fft}-1$ are respectively calculated.

wherein k is the frequency index, $N_{fft}$ is the number of Fourier transform points, the frequency interval is $\Delta f = T_s/N_{fft}$, wherein $T_s$ is the sampling interval of the digital signal in the time domain.

In order to eliminate the effect of the polarization mode dispersion, the embodiment of the present document takes the spectrums of the non-orthogonal signals in the two polarization directions according to the following equation $$X_t[k] = X[k]\cos\theta_t + Y[k]\sin\theta_t,$$

t=1, 2, wherein, $$\theta_1 = 0, \theta_2 = \frac{\pi}{4}$$

In step 201, it is to respectively calculate autocorrelation sequences of the frequency domain signals in the two polarization direction to obtain values of the autocorrelation sequences corresponding to the frequency domain signals in the two polarization directions; wherein, the interval for calculating the autocorrelation sequences is a baud rate.

In the step, according to the following equation, it is to calculate the autocorrelation $C_1[k]$ sequence of the spectrum $X_1[k]$ and the autocorrelation sequence $C_2[k]$ of the spectrum $X_2[k]$.

$$C_t[k] = X_t[k]X_t^{*k}[k+k_{baud}],$$

k=0, . . . , K, t=1, 2, wherein, K is an integer not greater than $N_{fft}-1-k_{baud}$, $k_{baud}$ is the frequency index interval corresponding to the baud rate.

In step 202, it is to respectively perform the fast inverse Fourier transform on the values of the two autocorrelation sequences in step 201 to obtain two inverse Fourier transform results.

$$P_t[n] = \Sigma_{k=1}^{K} C_t[k]\theta^{j2\pi nk/N_{1fft}},$$

n=$-N_{1fft}$, . . . , $N_{1fft}-1$, t=1, 2,

Wherein $N_{1fft}$ is the number of Fourier transform points.

In step 203, it is to respectively calculate modulus squares of the two fast inverse Fourier transform results in step 202 to obtain two modulus square results, and add the two modulus square results to obtain the sum of the modulus square results P[n].

$$P[n] = |P_1[n]|^2 + |P_2[n]|^2,$$

n=$-N_{1fft}$, . . . , $N_{1fft}-1$ in step 204, it is to perform the abovementioned steps 201-203 on multiple groups of IQ-imbalance compensated data to obtain sums of the multiple modulus square results, and average all the sums of the modulus square results to obtain a dispersion objective function P[n].

Figure 3:
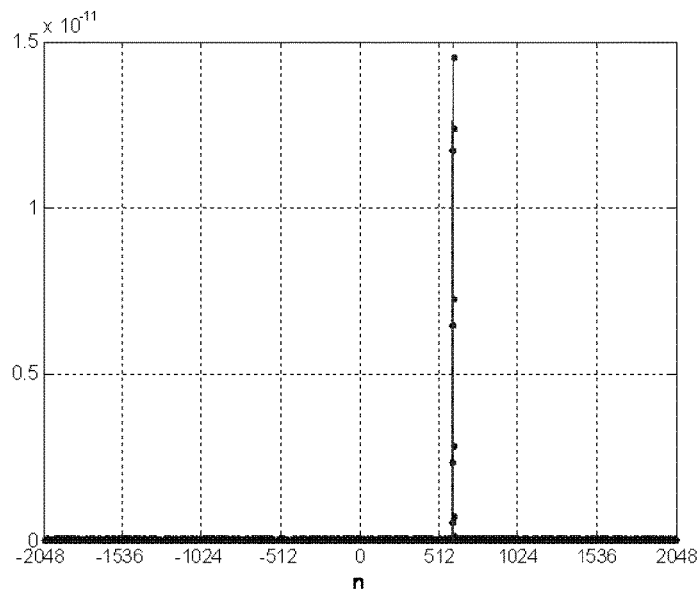
FIG. 3 is a simulated P[n] curve in accordance with an embodiment of the present document.

FIG. 3 shows the obtained P[n] curve. The simulation condition is, the polarization multiplexing DQPSK coherent optical communication coefficients, the system bit rate is 112 Gbit/s, the baud rate is 28 Gbaud, the ADC sampling rate of the optical digital coherent receiver is twice of the standard rate. The number of Fourier transform points in step 200 is 4096, the number of inverse Fourier transform points in step 203 is also 4096. In FIG. 3, the chromatic dispersion value of the data sources used in the offline simulation is 48000 ps/nm.

In step 205, it is to calculate the index $n_0$ of the maximum value of the dispersion objective function P[n].

In order to increase the resolution of the integer index $n_0$, after the operation of the step 205, it may also use the interpolation equation to correct $n_0$. For example, the following Parabolic interpolation equation is used to correct $n_0$:

$$n'_0 = n_0 + \frac{\tilde{P}[n_0-1] - \tilde{P}[n_0+1]}{2(\tilde{P}[n_0-1] - 2\tilde{P}[n_0] - \tilde{P}[n_0+1])};$$

FIG. 3 shows the P[n] curve obtained when the chromatic dispersion value of the data source used in the offline simulation is 48000 ps/nm, the integer index is calculated as 605, and the interpolated corrected accurate index is 605.0695.

In step 206, it is to estimate the optical fiber link dispersion value based on the index of the maximum value of the dispersion objective function P[n].

In this step, it is to estimate the fiber link dispersion value CD according to the following equation:

$$CD = \frac{n'_0}{\Delta f \cdot N_{1fft}} \cdot \frac{c}{\lambda^2 f_{baud}}$$

wherein, c is the speed of light in vacuum, $\lambda$ is the wavelength of the optical carrier in vacuum, and $f_{baud}$ is the baud rate.

Figure 4:
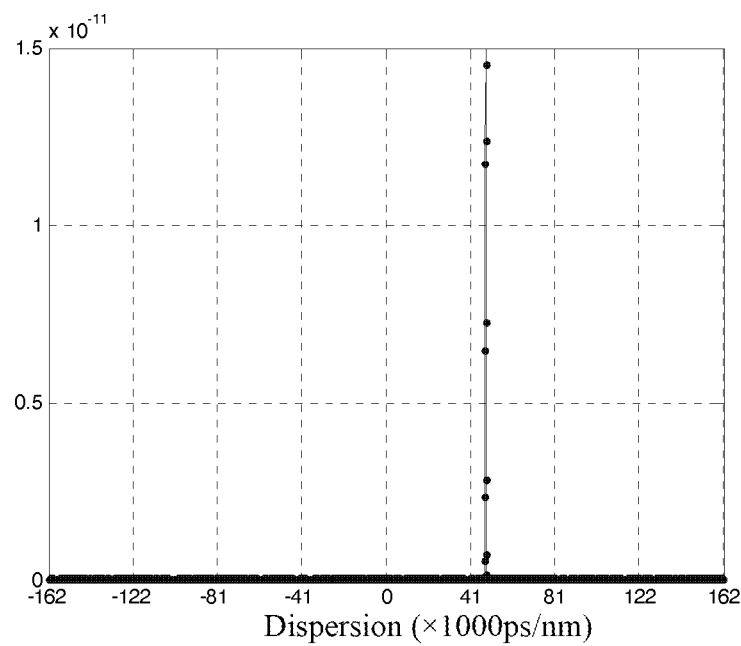
FIG. 4 is a simulated P[n] curve in accordance with an embodiment of the present document, wherein, the abscissa represents the dispersion value.
Figure 5:
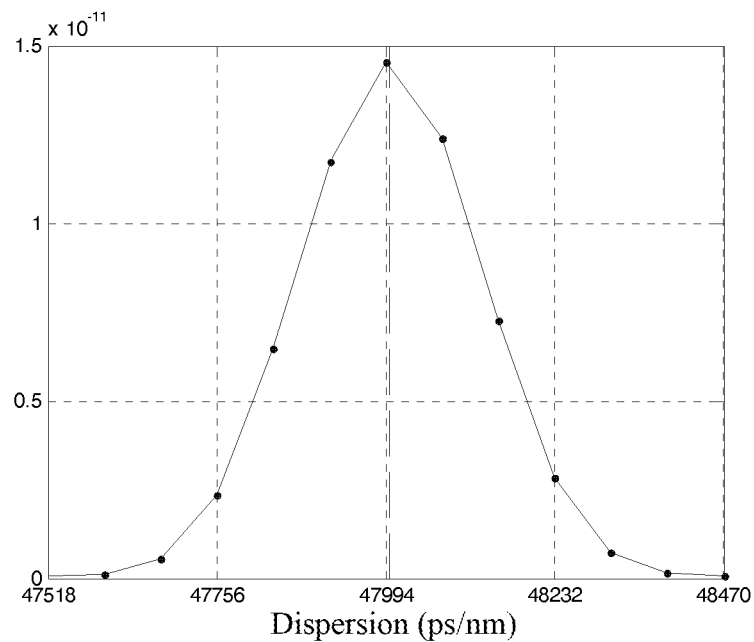
FIG. 5 is a locally enlarged diagram of the simulated P[n] curve in accordance with an embodiment of the present document.

Since the index P[n] of and the dispersion have a correspondence, the abscissa in FIG. 3 represents the dispersion, as shown in FIG. 4. As it can be seen from FIG. 4, the estimated dispersion value range is −162 ns/nm to 162 ns/nm. FIG. 5 is obtained by enlarging the local part of FIG. 4. In FIG. 5, the dispersion value corresponding to the index 605 is 47994 ps/nm, the dispersion value corresponding to the corrected accurate index 605.0695 is 48000 ps/nm. It demonstrates that the dispersion estimation accuracy in the embodiment of the present document is very high.

After the simulation with a lot of data, the dispersion estimation error in the abovementioned technical solution is a few ps/nm. While in the dispersion estimation method in the related art, such as in the dispersion search method in which the MSE value converged by the adaptive equalizer is the objective function, the estimation error is several hundreds of ps/nm. The dispersion estimation error in the technical solution of the present application has been improved by more than a hundred times of the accuracy of the dispersion estimation method in the related art.

Moreover, the abovementioned technical solution can directly calculate the dispersion without searching, thus, when the system starts, it can quickly estimate the value of the link dispersion. When the system is running, it may also continue to estimate the link dispersion value and track its change, and ensure the dispersion compensation module to precisely compensate the dispersion. The precise dispersion compensation can reduce the complexity of the clock recovery module thereafter, and the like.

The Second Embodiment

Figure 6:
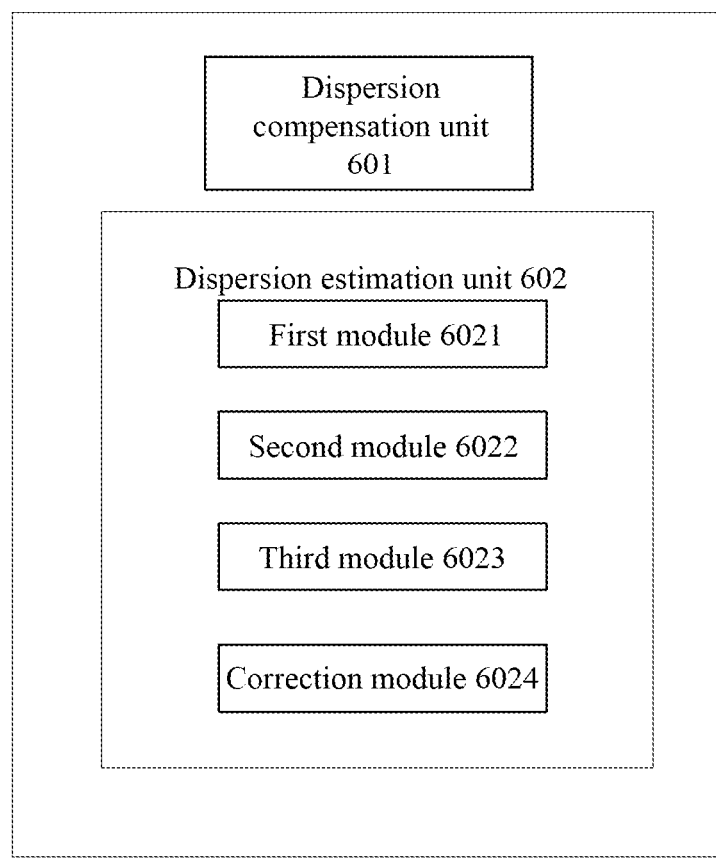
FIG. 6 is a schematic diagram of a dispersion estimation device in accordance with an embodiment of the present document.

The embodiment of the present document further comprises a dispersion estimation device in optical coherent communication, as shown in FIG. 6, comprising at lease one processer executing a dispersion compensation unit 601 and a dispersion estimation unit 602, wherein:

the dispersion compensation unit 601 is configured to: perform the fast Fourier transform on IQ-imbalance compensated data to obtain frequency domain data in two polarization directions;

the dispersion estimation unit 602 is also divided into a first module 6021, a second module 6022 and a third module 6023, wherein:

the first module 6021 is configured to: respectively calculate autocorrelation sequences of the IQ-imbalance compensated and fast Fourier transformed frequency domain data in the two polarization directions;

the abovementioned first module 6021 is configured to: according to the following equation, calculate the autocorrelation sequence $C_1[k]$ of the spectrum $X_1[k]$ and the autocorrelation sequence $C_2[k]$ of the spectrum $X_2[k]$ in the frequency domain data in the two polarization directions, wherein, the autocorrelation sequence interval of the frequency domain data is baud rate:

$$C_t[k] = X_t[k] X_t^{*}[k+k_{baud}],$$

k=0, . . . , K, t=1, 2, in the above equation, K is an integer not greater than $N_{fft}-1-k_{baud}$, $k_{baud}$ is the frequency index interval corresponding to the baud.

The second module 6022 is configured to: respectively perform the fast inverse Fourier transform on the values of the two autocorrelation sequences; calculate modulus squares of the two fast inverse Fourier transform results, and add the results in the two polarization directions to obtain P[n].

in the embodiment of the present document, the second module 6022 is configured to: according to the following equation, respectively perform the fast inverse Fourier transform on the values of the two autocorrelation sequences:

$$P_t[n] = \sum_{k=1}^{K} C_t[k] \theta^{j2\pi nk/N_{1fft}},$$

n=−$N_{1fft}$, . . . , $N_{1fft}$−1, t=1, 2, wherein $N_{1fft}$ is the number of Fourier transform points.

Then, it is to calculate the modulus squares of the fast inverse Fourier transformed results according to the following equation, and add the results in the two polarization directions to obtain P[n].

$$P[n] 32 \; |P_1[n]|^2 + |P_2[n]|^2,$$

n=−$N_{1fft}$, . . . , $N_{1fft}$−1.

The third module 6023 is configured to: for determining the mean value P[n] of multiple groups of the data P[n], calculate an index $n_0$ of the maximum value of P[n], and estimate the optical fiber link dispersion value based on the index $n_0$ of the maximum value.

The abovementioned third module 6023 may calculate the optical fiber link dispersion value CD according to the following equation:

$$CD = \frac{n'_0}{\Delta f \cdot N_{1fft}} \cdot \frac{c}{\lambda^2 f_{baud}}$$

wherein, c is the speed of light in vacuum, $\lambda$ is the wavelength of the optical carrier in vacuum, and $f_{baud}$ is the baud rate.

Since the index P[n] of and the dispersion have a correspondence, the abscissa in FIG. 3 represents the dispersion, as shown in FIG. 4. As it can be seen from FIG. 4, the estimated dispersion value range is −162 ns/nm to 162 ns/nm. FIG. 5 is obtained by enlarging the local part of FIG. 4. In FIG. 5, the dispersion value corresponding to the index 605 is 47994 ps/nm, the dispersion value corresponding to the corrected accurate index 605.0695 is 48000 ps/nm. It demonstrates that the dispersion estimation accuracy in the embodiment of the present document is very high.

Alternatively, the dispersion estimation unit may further comprise a correction module 6024, and the correction module 6024 is configured to: after calculating the index $n_0$ of the maximum value of P[n], use an interpolation equation to correct the index $n_0$. For example, the following Parabola interpolation equation can be used to correct the index $n_0$:

$$n'_0 = n_0 + \frac{\tilde{P}[n_0 - 1] - \tilde{P}[n_0 + 1]}{2(\tilde{P}[n_0 - 1] - 2\tilde{P}[n_0] - \tilde{P}[n_0 + 1])};$$

it should also be noted that, when the first module 6021 in the dispersion estimation unit 602 calculates the autocorrelation sequences of the frequency-domain data in the two polarization directions obtained through the fast Fourier transform after the IQ-imbalance compensation, the frequency-domain data in the two polarization directions obtained through the fast Fourier transform after the IQ-imbalance compensation may be obtained by the dispersion compensation unit performing the frequency domain fast convolution transform on the IQ-imbalance compensated data, or it may be obtained by the dispersion estimation unit using the FFT transform. Wherein, when the dispersion estimation unit uses the FFT transform to obtain the frequency domain data in the two polarization directions, a Fourier transform module can be provided in the dispersion estimation unit to use the FFT transform to obtain the frequency domain data in the two polarization directions.

Other details of the dispersion estimation device in the abovementioned optical coherent communication can be found in the content of the first embodiment, and will not be discussed here.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

The above description is only preferred embodiments of the present document, and is not intended to limit the protection scope of the present document. Any modifications, equivalent substitutions and improvements made within the essence and principle of the present document should be included in the protection scope of the present document.

INDUSTRIAL APPLICABILITY

The abovementioned technical solution can directly calculate the dispersion without searching, thus, when the system starts, the value of the link dispersion can be quickly estimated. When the system is running, it may also continue to estimate the link dispersion value, track its change, and ensure the dispersion compensation module to precisely compensate the dispersion. It can achieve precise dispersion compensation, and can reduce the complexity of the clock recovery module thereafter, and the like. To sum up, compared with the related art, the abovementioned technical solution can very accurately estimate the dispersion value, and the estimation speed is fast. Therefore, the present document has very strong industrial applicability.

What is claimed is:

1. A dispersion estimation and compensation method in optical coherent communication, comprising the following steps that are executed by a digital signal processor of a digital coherent receiver:
   performing an imbalance compensation on an IQ;
   performing dispersion estimation; and
   performing dispersion compensation by using a dispersion value provided by the dispersion estimation;
   wherein performing the dispersion estimation comprises:
   performing a fast Fourier transform on IQ-imbalance compensated data to obtain frequency domain data in two polarization directions;
   respectively calculating autocorrelation sequences of the frequency domain data in the two polarization directions to obtain values of the two autocorrelation sequences corresponding to the frequency domain data in the two polarization directions;
   respectively performing the fast inverse Fourier transform on the values of the two autocorrelation sequences to obtain two inverse Fourier transform results;
   respectively calculating modulus squares of the two fast inverse Fourier transform results to obtain two modulus square results;
   adding the two modulus square results to obtain a sum of the modulus square results P[n];
   for a plurality of IQ-imbalance compensated data, calculating a plurality of sums of the modulus square results, averaging all sums of the modulus square results to obtain a dispersion objective function P[n];
   calculating an index $n_0$ of a maximum value of the dispersion objective function P[n], and estimating an optical fiber link dispersion value based on the index $n_0$.

2. The method of claim 1, wherein,
   the step of performing a fast Fourier transform on IQ-imbalance compensated data to obtain frequency domain data in two polarization directions comprises:
   respectively performing the fast Fourier transform on the two IQ-imbalance compensated polarization data to obtain frequency domain data X[k] and Y[k] in two polarization directions in the following manner, where k=0, ..., $N_{fft}$–1, k is a frequency index, $N_{fft}$ is a number of Fourier transform points:
   calculating a spectrum of non-orthogonal signals in the two polarization directions according to the following equation to obtain the frequency domain data in the two polarization directions:

$$X_t[k] = X[k] \cos \theta_t + Y[k] \sin \theta_t,$$

t=1, 2,
wherein, $$\theta_1 = 0, \theta_2 = \frac{\pi}{4}.$$

3. The method of claim 2, wherein,
   the step of performing a fast Fourier transform on IQ-imbalance compensated data to obtain frequency domain data in two polarization directions comprises:
   using a frequency domain convolution transform or a fast Fourier transform to obtain the frequency domain data in the two polarization directions.

4. The method of claim 3, wherein,
an autocorrelation sequence interval of the frequency domain data in the two polarization directions is a baud rate;
the step of calculating autocorrelation sequences of the frequency-domain data in the two polarization directions to obtain values of the two autocorrelation sequences corresponding to the frequency domain data in the two polarization directions comprises:
according to the following equation, calculating the autocorrelation sequence $C_1[k]$ of the spectrum $X_1[k]$ and the autocorrelation sequence $C_2[k]$ of the spectrum $X_2[k]$ in the frequency domain data in the two polarization directions:

$$C_t[k] = X_t[k] X_t^{*}[k+k_{baud}],$$

k=0, ..., K, t=1, 2,
wherein, K is an integer not greater than $N_{fft}-1-k_{baud}$, $k_{baud}$ is a frequency index interval corresponding to the baud rate.

5. The method of claim 4, wherein,
the step of respectively performing the fast inverse Fourier transform on the values of the two autocorrelation sequences to obtain two inverse Fourier transform results comprises:
according to the following equation, respectively performing the fast inverse Fourier transform on the values of the two autocorrelation sequences:

$$P_t[n] = \Sigma_{k=1}^{K} C_t[k] \theta^{j2\pi nk/N_{1fft}},$$

n=$-N_{1fft}$, ..., $N_{1fft}-1$, t=1, 2,
wherein $N_{1fft}$ is a number of Fourier transform points.

6. The method of claim 5, wherein,
the step of adding the two modulus square results to obtain a sum of the modulus square results P[n] comprises:
calculating the sum of the modulus square results according to the following equation:

$$P[n] = |P_1[n]|^2 + |P_2[n]|^2,$$

n=$-N_{1fft}$, ..., $N_{1fft}-1$, where $N_{1fft}$ is the number of Fourier transform points.

7. The method of claim 6, wherein,
after calculating the index $n_0$ of the maximum value of the dispersion objective function P[n], the method further comprises:
using an interpolation equation to correct the index $n_0$.

8. The method of claim 7, wherein,
the step of using the interpolation equation to correct the index $n_0$ comprises:
correcting the index $n_0$ according to the following Parabolic interpolation equation to obtain a corrected result:

$$n_0' = n_0 + \frac{\tilde{P}[n_0-1] - \tilde{P}[n_0+1]}{2(\tilde{P}[n_0-1] - 2\tilde{P}[n_0] - \tilde{P}[n_0+1])};$$

wherein, $n_0'$ is the corrected result.

9. The method of claim 8, wherein,
the step of estimating an optical fiber link dispersion value based on the index $n_0$ of the maximum value comprises:
calculating the fiber link dispersion value CD according to the following equation:

$$CD = \frac{n_0'}{\Delta f \cdot N_{1fft}} \cdot \frac{c}{\lambda^2 f_{baud}}$$

wherein, c is a speed of light in vacuum, λ is a wavelength of an optical carrier in vacuum, and $f_{baud}$ is a baud rate.

10. A digital coherent receiver, comprising a digital signal processor which performs steps in a dispersion compensation unit and a dispersion estimation unit after performing imbalance compensation on an IQ, wherein:
the dispersion estimation unit comprises a first module, a second module and a third module, wherein:
the first module is configured to: respectively calculate autocorrelation sequences of frequency domain data in two polarization directions to obtain values of the two autocorrelation sequences corresponding to the frequency domain data in the two polarization directions; wherein the frequency domain data in the two polarization directions are obtained by the dispersion compensation unit by performing a frequency domain fast convolution transform on IQ-imbalance compensated data, or, the frequency domain data in the two polarization directions are obtained by the dispersion estimation unit by performing a fast Fourier transform on the IQ-imbalance compensated data;
the second module is configured to: respectively perform the fast inverse Fourier transform on the values of the two autocorrelation sequences to obtain two inverse Fourier transform results; respectively calculate modulus squares of the two fast inverse Fourier transform results to obtain two modulus square results; add the two modulus square results to obtain a sum of the modulus square results P[n];
the third module is configured to: for a plurality of IQ-imbalance compensated data, average a plurality of obtained sums of the modulus square results to obtain a dispersion objective function P[n]; calculate an index $n_0$ of a maximum value of the dispersion objective function P[n], and estimate an optical fiber link dispersion value based on the index $n_0$; and
the dispersion compensation unit is configured to perform dispersion compensation by using the dispersion value provided by the dispersion estimation unit.

11. The digital coherent receiver of claim 10, wherein,
the dispersion estimation unit is configured to: perform a fast Fourier transform on IQ-imbalance compensated data to obtain frequency domain data in two polarization directions in the following manner:
respectively performing the fast Fourier transform on the two IQ-imbalance compensated polarization data to obtain the frequency domain data X[k] and Y[k] in the two polarization directions in the following manner, where k=0, ..., $N_{fft}-1$, is a frequency index, $N_{fft}$ is a number of Fourier transform points:
calculating a spectrum of non-orthogonal signals in the two polarization directions according to the following equation to obtain the frequency domain data in the two polarization directions:

$$X_t[k] = X[k] \cos \theta_t + Y[k] \sin \theta_t,$$

t=1, 2,
wherein $$\theta_1 = 0, \theta_2 = \frac{\pi}{4}.$$

12. The digital coherent receiver of claim 11, wherein,
the first module is configured to calculate autocorrelation sequences of the frequency-domain data in the two polarization directions to obtain values of the two autocorrelation sequences corresponding to the frequency domain data in the two polarization directions in the following manner:
according to the following equation, calculating the autocorrelation sequence $C_1[k]$ of the spectrum $X_1[k]$ and the autocorrelation sequence $C_2[k]$ of the spectrum $X_2[k]$ in the frequency domain data in the two polarization directions, wherein, the autocorrelation sequence interval of the frequency domain data is baud rate:

$$C_t[k]=X_t[k]X_t^{*}[k+k_{baud}],$$

k=0, ..., K, t=1, 2,
in the above equation, K is an integer not greater than $N_{fft}-1-k_{baud}$, $k_{baud}$ is a frequency index interval corresponding to the baud rate.

13. The digital coherent receiver of claim 12, wherein, the second module is configured to respectively perform the fast inverse Fourier transform on the values of the two autocorrelation sequences to obtain two inverse Fourier transform results in the following manner:
according to the following equation, respectively performing the fast inverse Fourier transform on the values of the two autocorrelation sequences:

$$P_t[n]=\Sigma_{k=1}^{K}C_t[k]\theta^{j2\pi nk/N_{1fft}},$$

n=$-N_{1fft}$, ..., $N_{1fft}-1$, t=1, 2,
wherein $N_{1fft}$ is a number of Fourier transform points.

14. The digital coherent receiver of claim 13, wherein, the second module is configured to add the two modulus square results to obtain a sum of the modulus square results P[n] in the following manner:
calculating the sum of the modulus square results P[n] according to the following equation:

$$P[n]=|P_1[n]|^2+P_2[n]|^2,$$

n=$-N_{1fft}$, ..., $N_{1fft}-1$.

15. The digital coherent receiver of claim 14, wherein, the dispersion estimation unit further comprises a correction module, wherein:
the correction module is configured to: use an interpolation equation to correct the index $n_0$.

16. The digital coherent receiver of claim 15, wherein, the correction module is configured to correct the index $n_0$ according to the following Parabolic interpolation equation:

$$n_0' = n_0 + \frac{\tilde{P}[n_0-1] - \tilde{P}[n_0+1]}{2(\tilde{P}[n_0-1] - 2\tilde{P}[n_0] - \tilde{P}[n_0+1])};$$

wherein, $n'_0$ is the corrected result.

17. The digital coherent receiver of claim 16, wherein, the third module is configured to estimate an optical fiber link dispersion value based on the index $n_0$ in the following manner:
calculating the fiber link dispersion value according to the following equation:

$$CD = \frac{n_0'}{\Delta f \cdot N_{1fft}} \cdot \frac{c}{\lambda^2 f_{baud}}$$

wherein, c is a speed of light in vacuum, $\lambda$ is a wavelength of an optical carrier in vacuum and $f_{baud}$ is a baud rate.

* * * * *